Feb. 7, 1950 E. J. POITRAS 2,496,917
THERMOSTATIC SWITCH
Filed April 19, 1946 2 Sheets-Sheet 1

EDWARD J. POITRAS, INVENTOR.

BY Emery, Booth, Townsend, Miller & Widen
ATTYS.

Feb. 7, 1950 E. J. POITRAS 2,496,917
THERMOSTATIC SWITCH
Filed April 19, 1946 2 Sheets-Sheet 2

EDWARD J. POITRAS, INVENTOR.

BY Emery, Booth, Townsend, Miller & Weidner
ATTYS.

Patented Feb. 7, 1950

2,496,917

UNITED STATES PATENT OFFICE 2,496,917

THERMOSTATIC SWITCH

Edward J. Poitras, Holliston, Mass.

Application April 19, 1946, Serial No. 663,281

3 Claims. (Cl. 200—137)

My present invention relates to thermal electric circuit makers and breakers and in particular to thermostatic switches of the expansible solid type. The invention aims to provide a precision-built, compact and simplified device of this class and to afford therefor a positive action and generally improved reliability in performance. The various features contributing to that end will be apparent from the accompanying drawings illustrating certain embodiments thereof, in which.

Figure 1:
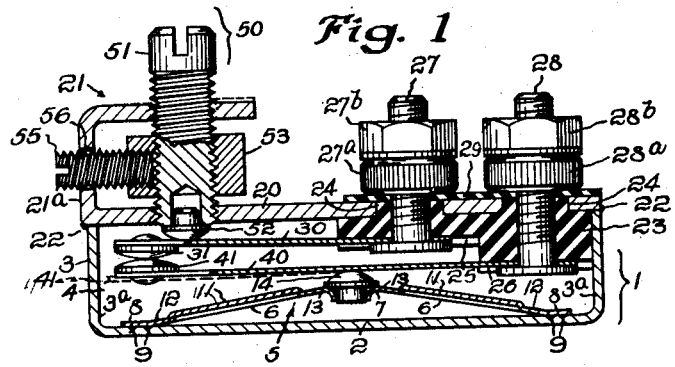
Fig. 1 is a longitudinal sectional view of one form of the thermal switch.
Figure 2:
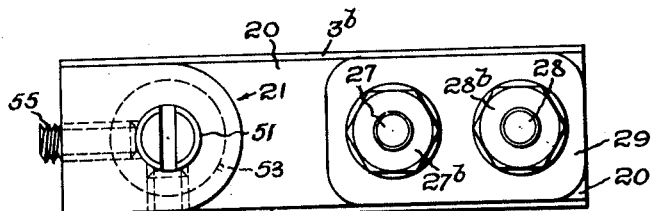
Fig. 2 is a plan of the device of Fig. 1.
Figure 3:
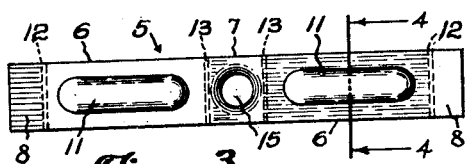
Figure 4:
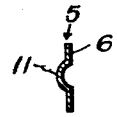
Figure 5:
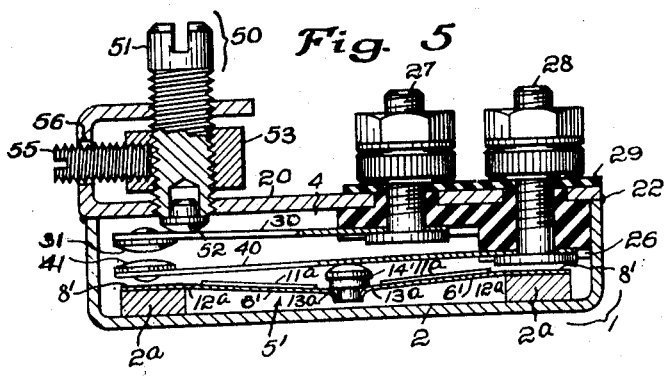
Figure 6:
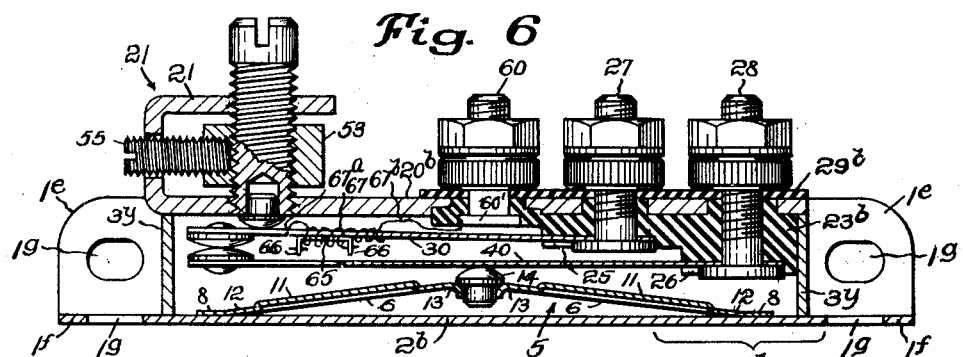
Figure 6A:
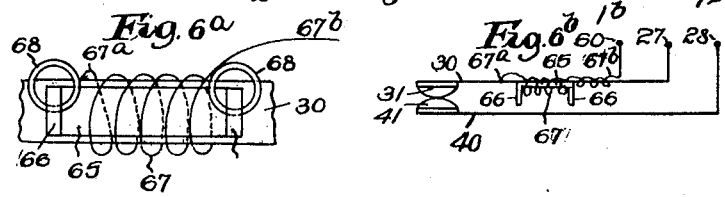
Figure 6B:
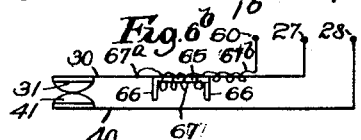
Figure 7:
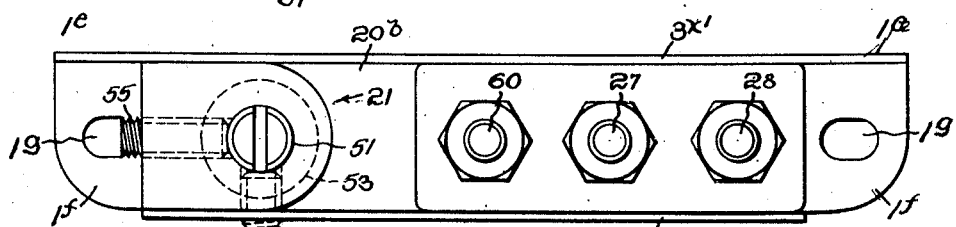
Figure 8:
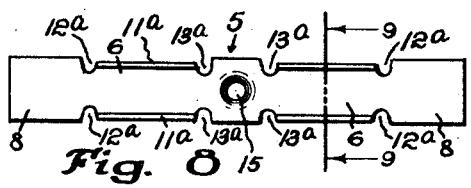
Figure 9:
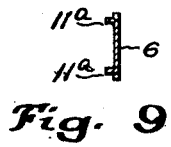

Figs. 3 and 4, the latter a section on line 4—4 of Fig. 3, show separately a strut element or bridge for a switch such as that of Fig. 1;

Fig. 5 is a view similar to Fig. 1 illustrating an inverse or heat closing form of the switch;

Figs. 6 and 7, corresponding to Figs. 1 and 2, show a further embodiment of the invention including additional features applicable also in connection with the devices of Figs. 1 to 5;

Figs. 6a and 6b are respectively an enlarged and partly schematic bottom plan view of a portion of one of the pair of leafs, and a wiring diagram, both pertinent to the device of Figs. 6 and 7; and Figs. 8 and 9, corresponding to Figs. 3 and 4, are a plan and cross-section respectively of one modified construction for the strut element.

Referring first to Figs. 1 and 2, the thermal switch comprises a metallic case or body 1 shown integrally formed from the metal stock as by deep drawing to provide a bottom 2 and a peripheral wall 3 together defining a cavity 4. The case bottom 2 fixedly supports a rigid-membered bridge-like structure or strut indicated generally at 5, one form of which appears separately in Figs. 3 and 4 and another in Figs. 8 and 9. This bridge or strut element 5 in hinged association with the case constitutes heat-responsive means with substantially springless positive motion-amplifying characteristics which accordingly do not change with time. It comprises symmetrical opposed levers or arms 6, 6 united in lengthwise angular relation at a more or less truncate peak 7 and presenting a triangular form with respect to the plane of the case bottom 2. The opposite ends 8, 8 of the strut are fixed flatwise upon the case bottom 2, preferably in spaced relation to the peripheral wall 3, as by spot welding at one or more points 9, 9, etc.

The arms 6, 6 of the strut are longitudinally ribbed along the intermediate straight portions for increased rigidity. As best seen in Figs. 3 and 4 the ribbing may be in the form of a central raised formation 11, while in the form of Figs. 8 and 9 longitudinal reinforcement is provided by upset marginal ribs as at 11a, 11a.

The strut 5 is provided with flexure hinges, one adjacent the fixed end of each arm as at 12, 12 and others at the inner ends of the arms at the peak 7, as at 13, 13, Figs. 1 and 3. Each such formation 12 and 13 comprises a transverse zone of weakness, which may be variously formed as by scoring, grooving or other hinge locating modification as indicated by the dotted lines on Fig. 3. In the Fig. 8 construction the transverse hinge locations are defined by opposed marginal nicks 12a and 13a. At the peak 7 a fulcral bearing in the form of an insulator button 14 is mounted on the strut 5 between the hinge points 13, 13, the button as shown being held in a central recess 15 in the strut; see Fig. 3. This non-conducting button 14 is operatively associated with the circuit make and break means to be described.

The case 1 and the strut 5 are fabricated from materials chosen for a substantial differential in characteristic thermal expansion. In Fig. 1, also Fig. 6, the invention is illustrated in a form for circuit breaking on heating, and to use a strut having the peak directed toward the circuit-forming means. Accordingly the more highly expansible material, as for example stainless steel, is employed for the case 1, and the strut 5 is fashioned of a material selected for a relatively low thermal expansion such as a nickel iron or other composition possessing the desired expansion differential with reference to the material of case 1. Thus with reference to Fig. 1 expansion of the case 1 in the presence of high temperature causes lengthening of the case bottom 2 and particularly the section between the anchored strut ends 8, 8. Such extension of the case bottom results in motion of the strut 5 at the button 14 toward the case bottom, downward in Fig. 1, the strut being relatively less expanded by the heat.

Since the strut as described is of substantial longitudinal rigidity the action at the peak portion 7 of the bridge-like structure is positive, having a very high spring gradient. By reason of the flexure hinge formations at 12, 13, and the stiff character of the lever-like arms 6, 6 the action is essentially pivotal, as between the case bottom and the peak 7, the latter in effect being supported and moved by an articulated lever pair.

The member which carry the electrical contact elements for operative control by the strut 5 are in accordance with the invention supported unitarily and in definite relation to the strut and the case, subject to temperature-setting adjustment if desired.

To that end the device includes a cover or closure plate 20 of the same material as the case 1 and adapted to seat on and in closing relation to it. Desirably the end portions 3a of the peripheral wall 3 are reduced in height, adapting the cover for substantially flush seating between the upper edge portions of the case side walls 3b; see Fig. 2. At one end the cover 20 is extended upwardly and reversely turned to provide a laterally open C-like yoke 21, later referred to. Upon assembly of the parts the case 1 and cover 20 desirably are non-demountably secured together in permanently closed relation as by welding indicated at 22.

Dependent at the inner face of the cover 20, at a portion of the case away from the yoke is a precision locator or mounting element 23 of insulating and heat resistant material, preferably a ceramic. This ceramic locator 23 is positioned and aligned on and relative to the cover and hence also to the case 1 by bosses 24 at its upper face fitted into apertures for the purpose in the cover. The locator 23 desirably is further fixedly positioned relative to the case body by abutment with the adjacent end wall 3a.

The inner or lower portion of the locator 23 has two levels respectively presenting vertically spaced aligned longitudinal positioning channels 25 and 26 for a pair of switch leafs 30 and 40. These extend lengthwise of the case in the portion of the cavity 4 above the button 14 of the bridge 5. The two leafs 30, 40 and the corresponding channels 25, 26 of the locator 23 are relatively proportioned in width and length for firm fitted reception of the corresponding ends of the leafs in the channels. The leafs 30, 40 are thus keyed against lateral swinging or misalignment and are further held against displacement by individual threaded studs 27, 28 headed at their lower ends and extending through apertures in the respective leafs and in the locator 23 centrally of the bosses 24 thereof. At the outside of the cover 20 the studs 27, 28 project through insulation 29 and are held by lock nuts 27a, 28a. The projecting portions of the studs constitute terminals for connecting electric conductors, being provided for the purpose with washers and hex nuts as at 27b, 28b. As above noted the switch leafs 30, 40 are constrained from angular motion about their respective studs 27, 28 by reason of the channnels 25, 26 of the locator, thus precluding them from inadvertent shorting or grounding against the sides of the case as might otherwise occur under the turning torque attendant on screwing down the hex nuts 27b, 28b in attaching lead wires when installing the device. The studs 27, 28 rigidly hold the locator 23 with respect to the cover 20 and hold the leafs 30, 40 in the channels of the locator. On assembly of the parts, with the cover held on the case end walls and abuttively between the side wall margins 3b, 3b, and with the case and cover interwelded as at 22 the entire enclosure and contained parts become in effect a unitarily rigid structure. Also as noted, the locator 23 is of a ceramic or other insulating material adapted to withstand both high temperatures and high voltages.

The switch leafs 30, 40 are formed of metals or alloys of good electrical conductivity. Further, the materials, construction and arrangement provide for substantial column-like stiffness lengthwise the leafs and for transverse springiness (vertically in the Fig. 1 position) adequate for efficient spring action at the maximum expected operating temperature. The lower and herein longer leaf 40 is accorded an initial spring bias, herein downward, toward and against the button 14 of the bridge 5. The other and herein upper and shorter leaf 30 is oppositely spring biased, upward against an adjustable reference element indicated generally at 50.

In addition to the properties of electrical conductivity, longitudinal rigidity and lateral spring bias for the respective leafs 30 and 40, the materials thereof are also selected to provide a distinct expansion differential as between the two leafs, taking into account the coefficient of expansion of the ceramic or other insulating locator 23. The lower leaf 40 preferably has the higher expansion coefficient. The purpose and effect in this connection will be further described. Electric contacts 31 and 41 are riveted or otherwise fastened to the respective leafs 30 and 40, in normal opposed relation at the leaf ends remote from the locator 23 and below the cover yoke 21. The contacts may be of silver or other conductive material as preferred for the purpose.

The reference element 50 for the contact carrying leafs 30, 40 is operatively presented by the yoke portion 21 of the cover 20. Vertically opposed portions of the yoke 21 are tapped in line to receive an adjusting screw or regulator 51 extending into the cavity 4 of the case for regulative engagement with the upper leaf 30 through a ceramic or other button-like insulating element 52 inserted in an axial recess in the screw. After the upper and lower parts of the yoke have been tapped for the screw they desirably are relatively shifted toward or from each other for a distance of about one-half a thread. The dotted lines on Fig. 1 indicate the initial position after threading but before shifting of the yoke parts. Thus the threads of the upper and lower screw-receiving apertures are placed approximately 180° out of phase. Hence when the adjusting screw 51 is inserted there is an axial loading of the threads which prevents drifting thereof under any vibration likely to be encountered in service yet leaves the screw 50—52 readily subjected to deliberate rotative adjustment.

Between the spaced yoke portions the adjusting screw 51 carries a threaded collar 53 which is tapped at one or more points around it for selectively receiving a radial screw member 55. This collar and screw element 53—55 serves a dual role in cooperation with the yoke 21 and the regulating reference element 50—52. When a fixed preselected temperature setting is desired the screw 55 is employed as a lock for the collar 53, by insertion through a hole 56 in the upright part 21a of the yoke and threading into one of the radial apertures in the collar, as seen in full lines in Figs. 1 and 2. The regulator screw 51 is thus positively locked in the appropriate position corresponding to the desired pre-set critical temperature for operation of the switch. At other times, when service conditions may make an adjustable temperature setting desirable, the radial screw 55 is removed from the locking position in the yoke 21 and inserted directly into the collar 53, at an open portion of the yoke and not through it, as shown dotted in Fig. 2. The radial screw 55 then becomes a limiting stop, permitting the adjusting screw 51 to be turned between limits defined by the edges of the vertical portion 21a of the yoke. This affords an adjustable range of temperature setting, so calculated that within the setting limits the contact leafs 30 and 40 remain closed as in Fig. 1 pending temperature increase to the particular point elected within the range of selective adjustment.

While the switch device of the invention is adapted for general use at heat-subject locations it is particularly suited for household and other electrical appliances, in view of the relatively small and compact form in which it may be embodied. It will be understood that the drawings, which are not to scale, represent twice size or more for many of the actual devices, which nevertheless may have load ratings as high as 1500 watts or thereabouts and a temperature range up to 600° F. or more.

The switch may be mounted in heat-subject relation in any convenient manner, preferably with the case 1 in good heat-conductive association with a heat-receiving part of the apparatus to be controlled. For example, the unitary device of Fig. 1 may be strapped or otherwise secured with a longitudinal wall of the case flatwise against the heat-subject part, or it may be provided with attaching ears, feet or the like as in the modification of Figs. 6 and 7. In operation, when the case 1 is subjected to high temperature the expansion lengthens the bottom 2 and causes motion toward it by the bridge strut 5 under the lesser expansion thereof. This motion is characterized by hinging flexure of the strut arms 6, 6 at the points 12 and 13 and is of an amplified maximum extent at the insulator button 14. The augmented movement there is a function of the normal angle between the arms. The resulting retraction of the button 14 allows the contiguous leaf 40 to open the contacts 31, 41, breaking the circuit.

It will be observed that the positive lever-like motion-amplifying device presented by the strut element 5 is such that the important operational characteristics do not change with time, any spring action therein having been substantially eliminated. The springiness of the contact-bearing leafs 30 and 40 contributes only biasing forces and therefore any change of spring characteristic in them does not alter the temperature setting.

Any desired setting for the switch-opening temperature, within the available range of regulation thereof, is had by shifting the reference element 50. Raising or lowering of the adjusting screw 51 and its insulating insert 52 correspondingly varies the position of the leaf pair 30, 40 as a unit with respect to the normal elevated position of the strut button 14. As above described, the collar and screw means 53—55 on the adjusting screw 51 provides in cooperation with the yoke 21 either for a locked pre-setting or for a user-controlled variable setting within a predetermined range, accordingly as the screw 55 is placed in the full line or the dotted line position of Figs. 1 and 2.

The operation of the device further involves a differential weld-shearing action for and at the contacts 31, 41. This is obtained through the novel structural combination as illustrated and described, including the longitudinal stiffness of the contact-bearing leaf members 30 and 40 and the differential expansion provided for them through the use of metals having differing coefficients of expansion. Hence when the switch heats up beyond the temperature setting a relative movement of the contacts 31, 41 takes place in the direction lengthwise of the leafs. This produces a shearing motion at the contact points and separates any weld that may have occurred between them. Such shearing motion is one of substantial force as applied by the differential change of length of the longitudinally stiff leafs 30, 40. Otherwise the only force to break contact welds would be the spring force of the longer leaf 40 coming into play when the button 14 of the strut 5 withdraws from the leaf under expansion of the case, and such spring force is generally inadequate to insure separation of the contacts. In accordance with the invention, however, the differentially expanding leafs 30, 40, being substantially straight and longitudinally rigid members, without offset, exert a shearing force which is substantial even for relatively small temperature excursions above the setting. This shearing force is additive to the spring force at the contacts resultant from the initial spring bias of the leaf 40 and insures a clean opening of the contacts, in spite of welding at the contacts. This markedly contrasts with prior devices in which the only separating force at the contacts is had by spring gradient of the contact carrying strips, under which relatively large temperature excursions above a set point may occur without separative opening of the contacts. The described weld-shearing action at the contacts is indicated in Fig. 1 by the dotted lining representative of a longitudinally shifted as well as lowered position of the under contact 41.

As previously indicated, the studs 27, 28 provide terminals for connection of the device into an electric circuit. When so installed continuity of the circuit is afforded through the leafs 30, 40 and the contacts 31, 41, the circuit being made or broken in accordance with the closed or open position of the latter. In the illustrative embodiment of Figs. 1 and 2 the switch is constructed and arranged normally to be closed as shown and to break circuit upon temperature rise to or beyond a set point, by reason of the relatively high expansibility of the case 1 and the lesser expansion of the hinged strut 5 against which the contiguous leaf 40 is spring biased. The invention is equally applicable to uses in which the switch normally is open and the circuit is to be made by closure of the contacts in response to a predetermined temperature rise. Such inverse operation may be had by reversing the constituent materials of the case 1 and of the strut 5 with respect to their thermal expansion coefficients. In such instance the strut 5 is fashioned of the relatively more expansive material and the case 1 of the material of a relatively lower expansion coefficient. Conductive or other subjection to heat then causes a relatively greater lengthening of the strut than of the case bottom 2 between the points 8 of strut anchorage, the strut accordingly being constrained to move the button 14 away from the case bottom 2, upward in Fig. 1, under the flexure hinging action, thereby closing the contacts and making the circuit. Such inverse form of the device, for circuit-making on heating, finds various use applications as for example in connection with refrigeration, ventilation and the like wherein a cooling action, air movement or other performance is desired on occurrence of a rise in temperature conditions.

The described inverse or heated circuit-making type of device may otherwise be constructed by availing of a reverse positioning of the displacement magnifying mechanism constituted by the bridge or strut element 5, as illustrated for example in Fig. 5. Here the materials of the case and of the displacement magnifier 5 as regards relative expansibility are assumed to be as first above described with reference to Figs. 1 and 2, namely higher expansion for the case 1 and a lesser expansion for the strut 5. In Fig. 5 corresponding parts are similarly numbered as in the preceding figures and parts not otherwise referred to may be the same as already described.

Referring to Fig. 5, the bridge or strut 5' comprised in the displacement magnifying means is itself inverted. The triangle defined by the stiff arms 6', 6' and the plane of the fixed strut ends 8', 8' has the apex toward the case bottom 2. The insulator button 14' is centrally positioned on the strut 5' within the angle defined by the strut arms 6', 6' and is of a height for operative engagement with the contiguous leaf 40 which again is initially biased against it. The ends 8', 8' of the strut 5' are secured as by welding to integral or other blocks, ribs or the like 2a fixed on the case bottom 2 in heat conductive relation to it. These end-supporting members 2a are of a height and are located so as to accommodate the inverted strut 5' in the casing cavity space between them and to afford the appropriate transverse motion for the button 14'.

It will be evident with reference to Fig. 5 that when the case 1 is subject to high temperature the relatively greater longitudinal extension of the case bottom as compared with that of the strut 5' will cause hinging movement of the latter about the flexure hinges 12a, 13a in the direction away from the case bottom (upward in Fig. 5) thereby forcing the normally open contacts 31, 41 into closed circuit-making relation.

The described inverse strut form of Fig. 5 also is susceptible of an expansion differential arrangement so as to make the circuit on temperature rise, similarly as explained in connection with Fig. 1. That is, in the Fig. 5 example a reverse inverse action of circuit-breaking in response to temperature rise may be had by interchanging the case and the strut materials with respect to their relative expansibility, the inverted strut 5' then being the element of relatively greater expansibility.

Figs. 6 and 7 show a further embodiment of the invention in which the general construction may be regarded as the same as in the previous figures. For illustration the switch is here shown as of the normally closed type designed to break the circuit on heating, as in Fig. 1, but it may be of any of the types previously mentioned. In this instance the case 1b is represented as fabricated from sheet metal stock shaped to a generally rectangular enclosure form including upturned side walls 3x, 3x' one of which has end portions bent transversely to provide end walls 3y. Two mutually perpendicular walls, herein the bottom 2b and the side wall 3x' are extended to form mounting ears 1e, 1e and 1f, 1f, having mounting apertures 1g. These latter, providing for either side or bottom mounting of the switch device, desirably are elongated for ease in attachment and to allow for shift of the case relative to the supporting means in the course of thermal expansion and contraction. As already noted, similar integral or other mounting ears may be provided for the switches of the preceding figures.

In the instance of Figs. 6 and 7, the switch body including the case 1b and the cover 20b are longitudinally proportioned to accommodate an additional and alternatively available terminal stud 60. The contact-bearing leafs 30, 40 and the displacement-magnifying strut element 5b are correspondingly proportioned. The third terminal 60 of Fig. 6 provides for alternative electrical connection of certain auxiliary means providing the switch with either or both features of a snap action and of an anticipatory action compensating for "process lag" in the system or apparatus for circuit control of which the switch is to be employed.

Referring still to Figs. 6 and 7 one of the contact-carrying leafs, herein the upper and shorter leaf 30 carries an electro-magnetic device comprising an inverted U-shaped piece 65 of magnetic material at the inner face of this leaf and having the legs 66 extended toward the other leaf 40. A coil 67 of fine insulated conductive wire is wrapped about the yoke of the magnetic U-piece 65 and also about the leaf 30 itself, the construction desirably being such that this entire electromagnetic device may be adjustably shifted lengthwise of the leaf 30; see also Figs. 6a and 6b.

The number of turns and the resistance of the coil 67 is determined in accordance with the desired magnitude of two characteristics, namely the magnetic field desired and the heat-creating capacity desired from the coil as a resistive element. One end of the coil is flexibly connected electrically to the leaf 30 as at 67a. The other end of the coil is flexibly extended and connected as at 67b to the stud 60 as by anchorage and electrical union beneath the riveted end 60' thereof, the stud being insulated from the cover 20b as by extensions of the locator 23b and of the exterior insulation 29b. For A. C. installations, to smooth the magnetic force fluctuation otherwise tending to cause chatter of the contacts 31, 41, the electro-magnetic device 65 may be provided in known manner with shading rings 68 each encircling about a one-half portion of the respective leg 66 of the magnetic piece 65; see particularly Fig. 6a.

When the described electro-magnetic means is to be employed the connections for the circuit in which the switch is installed are made at the end terminal stud 28 and the auxiliary stud 60, with no connection at the terminal stud 27. Thus the coil 67 of the electro-magnetic device is placed in series with the switch contacts 31, 41, the circuit being through the stud 60, the coil 67, the leaf 30, the contacts 31, 41 and the leaf 40 and via it to the outer terminal stud 28.

In operation, with the contacts 31, 41 closed, the coil 67 is energized. The resulting magnetic flux in piece 65 and the immediately adjacent portion of the opposite leaf 40, which in this instance also is of magnetic material, tends to maintain the contacts closed against force conditions acting in the separating direction. When the operative force condition overcomes the magnetic holding force sufficiently to compel a break of the electric circuit the magnetic field is destroyed. Consequently the previously magnetically held leaf 40 snaps open under the extreme force unbalance. Conversely, at the moment of establishment of the magnetic field upon circuit-closing engagement of the contacts 31, 41 the supplemental magnetic holding force thereof tends to seal the electric circuit. Thus as illustrated in Fig. 6 a snap action is afforded in a thermostat having capacity for temperature differential as to the selective temperature setting. Further, through the described electro-magnetic means and herein by utilizing one and the same coil 67 a pre-heating lag-compensating anticipatory effect is had. During the period of contact closure and magnetic field energization the current passing through the coil 67 causes resistance heating within the thermostat case 1 and effective upon the latter and the strut 5. The result is an effect known in other connections in this general art as "anticipation," that is, an operative preparation of the thermostat to take into account a time lag in the associated system or apparatus. Further, by shifting the position of the electromagnetic means 65—68 lengthwise of the leafs 30, 40 the effective extent of the described differential weld-shearing action between them may be variably adjusted.

My invention is not limited to the particular embodiments thereof illustrated and described herein, and I set forth its scope in my following claims.

I claim:

1. In a thermostatic switch, a heat-subject support, thermal displacement magnifying means thereon comprising with the support a triangular strut-like structure having equal length rigid segments hingedly joined at the adjacent ends and to the support at the remote ends, the support and said structure having relatively different thermal expansibility, a pair of spring leafs also of mutually different thermal expansibility and of columnar rigidity lengthwise, said leafs carrying electrical contacts in opposed relation, and a reference element positioned with respect to the support, the leafs being spring biased one against the reference element and the other oppositely against the joined ends of the hinged segments in pressing and sliding relation thereto, whereby the contacts are opened and closed under thermal action conjointly as between the support and the hinged segments and as between the leafs themselves as facilitated by the segment hinging action and the sliding relation thereto under minimum spring bias for the leafs and minimum critical displacement of the hinged segments.

2. In a thermostatic switch, a supporting body, a triangular actuator bridge having two equal lever-like lengthwise rigid sides and having a central peak portion, the bridge sides having the adjacent ends hinged to the peak portion at the opposite sides thereof and being hinged to the supporting body at the remote ends, the peak portion carrying a non-conductive fulcral member for pressing and sliding bearing engagement with a contact carrying leaf, said peak portion directed laterally of the region of support on the body and the latter having a different coefficient of thermal expansion than the bridge, a pair of spaced parallel spring leafs supported at adjacent ends with one of them biased toward and in pressing and sliding contact with the fulcral member, a reference element against which the other leaf is biased, the leafs being individually of columnar rigidity and of mutually different thermal expansibility and carrying opposed electrical contacts, the actuator bridge adapted normally to present the contacts in one relative position in the absence of heating and to effect reversal of contact position on heating through attendant modification of the pressing action of the fulcral member relative to the adjacent leaf and conjointly through relative thermal expansion and contraction of the leafs as permitted by the sliding contact of said adjacent leaf with the fulcral member.

3. In a thermostatic switch, a housing defining a cavity, a pair of contact-carrying leafs mounted in the cavity, a regulator screw for positioning engagement with one leaf, a screw-mounted yoke on the housing having opposed spaced walls and a connecting wall paralleling the screw axis, the regulator screw having threaded support on the spaced walls and having a collar threaded on it between said walls, a tapped radial aperture in the collar, a positioning recess in the yoke connective wall, and a threaded member receivable in the collar aperture in alternative positions either through the yoke connective wall at the recess therein or external to said wall thereby respectively to lock the collar or to afford it a predeterminedly limited variable angular positioning.

EDWARD J. POITRAS.

REFERENCES CITED

The following references are of record in the file of this patent:

UNITED STATES PATENTS

| Number | Name | Date |
|---|---|---|
| 490,926 | Roberts | Jan. 31, 1893 |
| 991,661 | Steen | May 9, 1911 |
| 1,134,547 | Neahr | Apr. 6, 1915 |
| 1,198,340 | Garretson | Sept. 12, 1916 |
| 1,651,408 | Peacock | Dec. 6, 1927 |
| 2,002,467 | Blodgett | May 21, 1935 |
| 2,081,269 | Carlson | May 25, 1937 |
| 2,092,327 | Persons | Sept. 7, 1937 |
| 2,217,328 | Barnes | Oct. 8, 1940 |
| 2,254,720 | Wilcox | Sept. 2, 1941 |
| 2,389,686 | Reingruber et al. | Nov. 27, 1945 |
| 2,418,647 | Jordan | Apr. 8, 1947 |